US010800670B2

(12) United States Patent
Antonneau

(10) Patent No.: US 10,800,670 B2
(45) Date of Patent: Oct. 13, 2020

(54) BIOLOGICAL CONTACT AND DISSOLVED AIR FLOTATION TREATMENT OF STORM WATER

(71) Applicant: Evoqua Water Technologies LLC, Pittsburgh, PA (US)

(72) Inventor: Nathan Antonneau, Queen Creek, AZ (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 16/309,981

(22) PCT Filed: Jun. 14, 2017

(86) PCT No.: PCT/US2017/037355
§ 371 (c)(1),
(2) Date: Dec. 14, 2018

(87) PCT Pub. No.: WO2017/218605
PCT Pub. Date: Dec. 21, 2017

(65) Prior Publication Data
US 2019/0210891 A1 Jul. 11, 2019

Related U.S. Application Data

(60) Provisional application No. 62/349,924, filed on Jun. 14, 2016.

(51) Int. Cl.
*C02F 1/24* (2006.01)
*C02F 3/30* (2006.01)
(Continued)

(52) U.S. Cl.
CPC .............. *C02F 1/24* (2013.01); *C02F 3/006* (2013.01); *C02F 3/12* (2013.01); *C02F 3/1221* (2013.01);
(Continued)

(58) Field of Classification Search
CPC ...... C02F 1/24; C02F 1/52; C02F 3/12; C02F 3/1236; C02F 3/1221; C02F 3/006;
(Continued)

(56) References Cited

U.S. PATENT DOCUMENTS 7,208,090 B2 * 4/2007 Applegate ............... C02F 3/006
210/605
9,359,236 B2 6/2016 Erdogan et al.
(Continued)

FOREIGN PATENT DOCUMENTS

WO 2015/200478 A1 12/2015

OTHER PUBLICATIONS

Liu et al; "Wastewater Treatment, Enhanced Biological Treatment of Storm Flows," Elsevier Advanced Technology, vol. 47, No. 2, Mar. 1, 2010, pp. 23-27.
(Continued)

*Primary Examiner* — Nam X Nguyen
*Assistant Examiner* — Julia L. Wun

(57) ABSTRACT

A wastewater treatment system includes a first sub-system having a biological treatment unit and a second sub-system having a dissolved air flotation unit. A method of treating wastewater includes directing a first stream of wastewater to a biological treatment unit and directing an overflow stream of wastewater to a dissolved air flotation unit. A method of facilitating treatment of overflow wastewater in a biological treatment system includes connecting an overflow treatment system in a parallel configuration with the biological treatment system, the overflow treatment system having a dissolved air flotation unit, and directing a fraction of activated sludge from the biological treatment system to the overflow treatment system.

20 Claims, 3 Drawing Sheets

(51) Int. Cl.
    *C02F 3/00*     (2006.01)
    *C02F 3/12*     (2006.01)
    *C02F 103/00*     (2006.01)
    *C02F 1/52*     (2006.01)
    *C02F 101/32*     (2006.01)

(52) U.S. Cl.
    CPC .............. *C02F 3/1236* (2013.01); *C02F 3/30* (2013.01); *C02F 1/52* (2013.01); *C02F 2101/32* (2013.01); *C02F 2103/001* (2013.01); *C02F 2209/40* (2013.01); *C02F 2301/043* (2013.01); *Y02W 10/10* (2015.05)

(58) Field of Classification Search
    CPC .. C02F 3/30; C02F 3/301; C02F 3/302; C02F 3/308; C02F 2301/043; C02F 2101/32; C02F 2209/40; C02F 2103/001; Y02W 10/15
    USPC ......................... 210/608, 623, 252, 253, 259
    See application file for complete search history.

(56) References Cited

U.S. PATENT DOCUMENTS

| | | |
|---|---|---|
| 2011/0120955 A1 | 5/2011 | Wood |
| 2014/0238932 A1* | 8/2014 | Erdogan .................. C02F 3/12 210/605 |
| 2016/0083268 A1 | 3/2016 | Erdogan et al. |

OTHER PUBLICATIONS

Supplementary European Search Report, corresponding EP 17 81 3981, dated Dec. 16, 2019.

* cited by examiner

BIOLOGICAL CONTACT AND DISSOLVED AIR FLOTATION TREATMENT OF STORM WATER

RELATED APPLICATIONS

This application is a national stage application under 35 U.S.C. § 371 of PCT Application Serial no. PCT/US2017/037355 which claims priority under 35 U.S.C. § 119(e) to U.S. Provisional Application Ser. No. 62/349,924 titled "Biological Contact and Dissolved Air Flotation Treatment of Storm Water" filed on Jun. 14, 2016, which is herein incorporated by reference in its entirety.

FIELD OF TECHNOLOGY

Aspects and embodiments disclosed herein relate to systems and methods of treating wastewater. More particularly, aspects and embodiments disclosed relate to systems and methods of treating wastewater by directing a first stream of wastewater to a biological treatment unit and selectively directing an overflow stream of wastewater to an overflow treatment system, operating in parallel with the biological treatment unit.

SUMMARY

In accordance with an aspect, there is provided a wastewater treatment system comprising a first sub-system and a second sub-system. The first sub-system and the second sub-system may be arranged to operate in a parallel configuration. The first sub-system may comprise a wastewater conduit, a biological treatment unit, and a solids-liquid separation unit. The second sub-system may comprise a contact tank and a dissolved air flotation unit.

In some embodiments, the first sub-system comprises a wastewater conduit in fluid communication with a source of wastewater. The wastewater conduit may have a wastewater outlet and an overflow outlet, the overflow outlet configured to output overflow wastewater. The first sub-system may further comprise a biological treatment unit having an inlet in fluid communication with the wastewater outlet of the wastewater conduit. The biological treatment unit may be configured to biologically break down organic components of the wastewater to form a first mixed liquor. The first sub-system may further comprise a solids-liquid separation unit having an inlet in fluid communication with the biological treatment unit. The solids-liquid separation unit may be configured to separate solids from a portion of the first mixed liquor and form a first solids-lean effluent and a return activated sludge. The solids-liquid separation unit may further be configured to output the first solids-lean effluent through an effluent outlet and output the return activated sludge through a return activated sludge outlet. In some embodiments, the solids-liquid separation unit comprises a clarifier.

In certain embodiments, the second sub-system comprises a contact tank having a first inlet in selective fluid communication with the overflow outlet of the wastewater conduit. The contact tank may have a second inlet in selective fluid communication with the return activated sludge outlet. The contact tank may be configured to mix the overflow wastewater with the return activated sludge to form a second mixed liquor. The second sub-system may further comprise a dissolved air flotation unit having an inlet in fluid communication with the contact tank. The dissolved air flotation unit may be configured to separate suspended matter from a portion of the second mixed liquor and form a second solids-lean effluent, floated solids, and waste solids. The dissolved air flotation unit may further be configured to output the second solids-lean effluent through an effluent outlet of the dissolved air flotation unit. The dissolved air flotation unit may be configured to remove fats, oils, and grease from the second mixed liquor.

The wastewater treatment system may further comprise a valve positioned upstream from the contact tank. The valve may be positioned within the wastewater conduit. The valve may be configured to selectively provide fluid communication between the overflow outlet and the contact tank. In some embodiments, the system further comprises a flow meter positioned upstream from the valve. The flow meter may be positioned within the wastewater conduit. The flow meter may be configured to measure a flow rate of the wastewater. In some embodiments, the flow meter is in electrical communication with the valve, which may be configured to provide fluid communication between the overflow outlet and the contact tank responsive to a flow rate of the wastewater exceeding a threshold flow rate. The wastewater treatment system may further comprise a valve positioned upstream from the contact tank. The valve may be configured to selectively provide fluid communication between the return activated sludge outlet of the first sub-system and the contact tank.

In accordance with certain embodiments, the wastewater treatment system may further comprise an effluent conduit extending between a floated solids outlet of the dissolved air flotation unit and a second inlet of the biological treatment unit. The wastewater treatment system may comprise an effluent conduit extending between a floated solids outlet of the dissolved air flotation unit and a third inlet of the contact tank.

The biological treatment unit of the first sub-system may comprise an aerated anoxic region and an aerobic region. The biological treatment unit of the first sub-system may comprise an aerated anoxic tank and an aerobic tank fluidly connected to each other.

In some embodiments, the wastewater treatment system further comprises a primary clarifier. The primary clarifier may comprise an inlet in fluid communication with the source of the wastewater, a solids-lean outlet, and a solids-rich outlet. The solids-lean outlet of the primary clarifier may be in fluid communication with at least one of the biological treatment unit and the contact tank. The wastewater treatment system may further comprise an anaerobic digester. The anaerobic digester may have a first inlet in fluid communication with the dissolved air flotation unit, a second inlet in fluid communication with the solids-rich outlet of the primary clarifier, and an outlet in fluid communication with at least one of the solids-liquid separation unit and the biological treatment unit. The wastewater treatment system may further comprise a thickener unit. The thickener unit may comprise an inlet in fluid communication with the solids-rich outlet of the primary clarifier and an outlet in fluid communication with the anaerobic digester.

In accordance with another aspect, there is provided a method of treating wastewater. The method comprises directing a first stream of wastewater to a biological treatment unit, directing a biologically treated mixed liquor to a solids-liquid separation unit, selectively directing an overflow stream of wastewater to a contact tank, selectively directing a first fraction of activated sludge from the solids-liquid separation unit to the contact tank, directing an overflow mixed liquor to a dissolved air flotation unit, and directing the solids-lean effluent from the solids-liquid separation unit and the solids-lean effluent from the dissolved air flotation unit to a treated water outlet.

The method of treating wastewater may comprise directing a first stream of wastewater to a biological treatment unit and biologically treating the first stream of wastewater in the biological treatment unit to form a biologically treated mixed liquor. The method may further comprise directing the biologically treated mixed liquor to a solids-liquid separation unit and separating the biologically treated mixed liquor in the solids-liquid separation unit. The biologically treated mixed liquor may be separated in the solids-liquid separation unit to form a first solids-lean effluent and an activated sludge.

In some embodiments, the method of treating wastewater may comprise selectively directing an overflow stream of wastewater to a contact tank operating in parallel with the biological treatment unit and the solids-liquid separation apparatus. The overflow stream of the wastewater may be directed to the contact tank responsive to a flow rate of the first stream of the wastewater exceeding a threshold flow rate. The method may further comprise selectively directing a first fraction of the activated sludge to the contact tank and mixing the overflow stream of the wastewater with the activated sludge in the contact tank to form an overflow mixed liquor. The method may further comprise directing the overflow mixed liquor to a dissolved air flotation unit and separating the overflow mixed liquor in the dissolved air flotation unit. In some embodiments, the overflow mixed liquor may be separated to form a second solids-lean effluent, floated solids, and waste solids. In some embodiments, separating the overflow mixed liquor further comprises removing fats, oils, and grease from the overflow mixed liquor.

The method may further comprise directing the first solids-lean effluent and the second solids-lean effluent to a treated water outlet.

In certain embodiments, the method further comprises directing a first fraction of the floated solids to the biological treatment unit. The method may further comprise directing a second fraction of the floated solids to the contact tank.

The first fraction of the activated sludge may comprise between about 5% to about 100% of the activated sludge. In some embodiments, the method may comprise recycling a second fraction of the activated sludge to the biological treatment unit.

In accordance with certain embodiments, the method may comprise directing a wastewater to a primary clarifier and separating the wastewater in the primary clarifier to form a clarified wastewater and a solids-rich effluent. The method may further comprise directing a first fraction of the clarified wastewater to the first stream of the wastewater. The method may further comprise selectively directing a second fraction of the clarified wastewater to the overflow stream of the wastewater responsive to a flow rate of clarified wastewater in the first stream of the wastewater exceeding a threshold flow rate.

In accordance with another aspect, there is provided a method of facilitating treatment of overflow wastewater in a biological treatment system comprising a biological treatment unit in fluid communication with a solids-liquid separation unit. The biological treatment unit may be configured to produce a first solids-lean effluent and an activated sludge. The method of facilitating treatment may comprise connecting an overflow treatment system to an overflow wastewater stream and connecting a return activated sludge conduit between the biological treatment system and the overflow treatment system.

In some embodiments, the method comprises connecting the overflow treatment system in a parallel configuration with the biological treatment system. The overflow treatment system may be in selective fluid communication with the overflow wastewater stream, responsive to a flow rate of the first wastewater stream exceeding a threshold flow rate. In some embodiments, the overflow treatment system comprises a contact tank in fluid communication with a dissolved air flotation unit. The overflow treatment system may be configured to produce a second solids-lean effluent, floated solids, and waste solids. The method may comprise connecting an overflow treatment system configured to remove fats, oils, and grease from the overflow wastewater stream.

The method of facilitating treatment of overflow wastewater may comprise connecting a return activated sludge conduit between the biological treatment system and the overflow treatment system. The return activated sludge conduit may be configured to direct a fraction of the activated sludge to the overflow treatment system. The fraction of the return activated sludge may be directed to the overflow treatment system responsive to the overflow treatment system being in fluid communication with the overflow wastewater stream.

In certain embodiments, the method of facilitating treatment of overflow wastewater further comprises installing a flow meter upstream of the biological treatment unit and electrically connecting a valve to the flow meter. The flow meter may be configured to measure wastewater flow rate. The valve may be configured to direct a first fraction of the wastewater to the first wastewater stream and a second fraction of the wastewater to the overflow wastewater stream. The first fraction of the wastewater and the second fraction of the wastewater may be directed responsive to the measurement of wastewater flow rate from the flow meter exceeding a threshold flow rate.

The method may further comprise providing instructions to direct a fraction of the return activated sludge to the overflow treatment system responsive to the flow meter measuring a flow rate exceeding the threshold flow rate. In some embodiments, the fraction of the return activated sludge directed to the overflow treatment system is increased proportionally to the flow rate measured by the flow meter. The method may further comprise providing instructions to direct substantially all of the wastewater to the first wastewater stream until the flow meter measures a threshold wastewater flow rate. The method may further comprise directing overflow wastewater to the overflow wastewater stream responsive to the flow meter measuring a flow rate exceeding the threshold flow rate.

In some embodiments, the method of facilitating treatment of overflow wastewater further comprises providing at least one of the overflow treatment system and the return activated sludge conduit.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
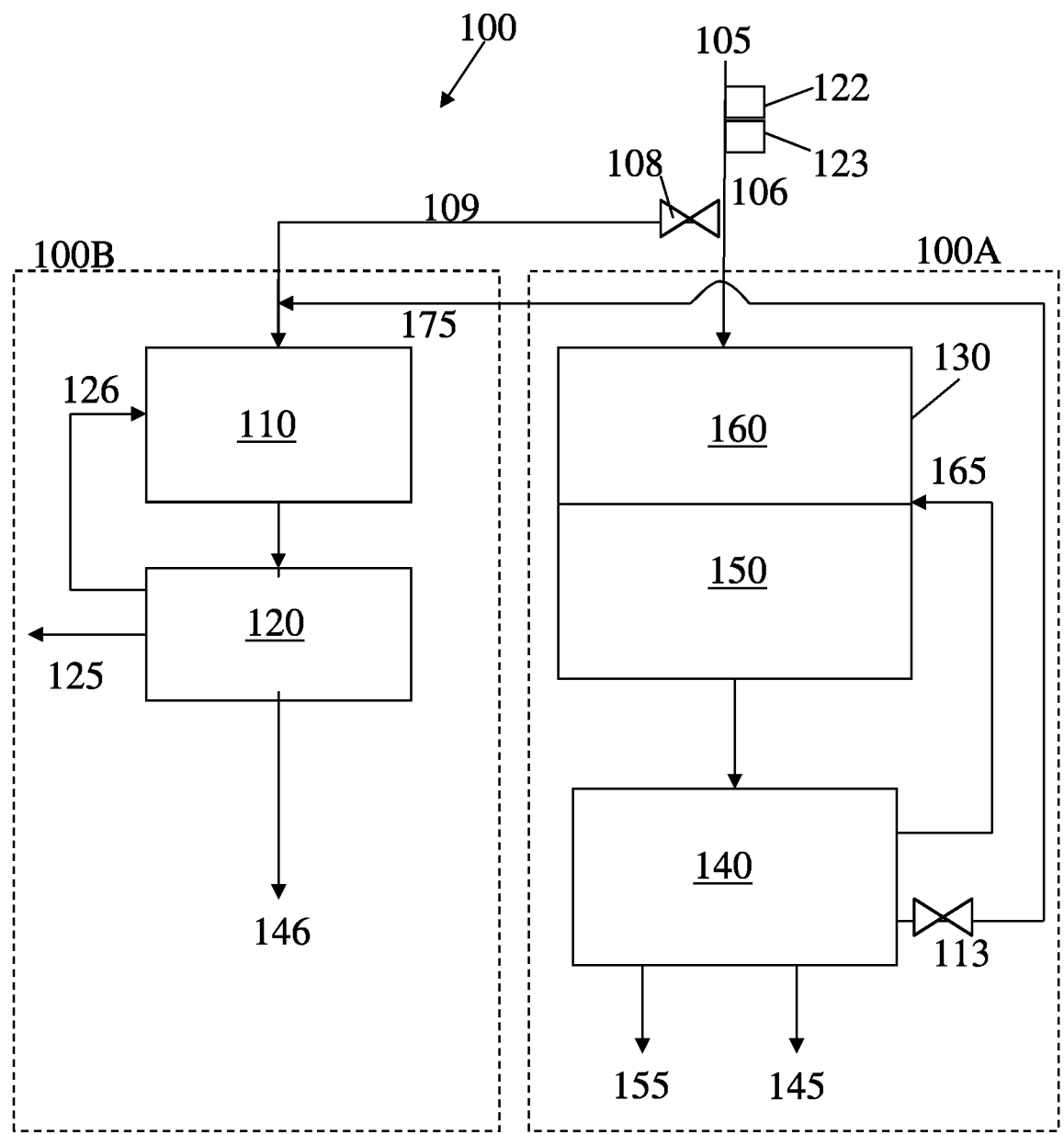
FIG. 1 is a block flow diagram of a wastewater treatment system in accordance with one embodiment.

Increased wastewater accumulation from wet weather events may cause a number of problems in municipal wastewater treatment systems. Certain wastewater systems are designed such that water from storm drains can mix with wastewater, causing a large increase in wastewater volume during a storm event. When storm water and wastewater volumes exceed the volume of water that can be treated using conventional municipal wastewater treatment systems, the excess wastewater can go untreated. The untreated excess wastewater in some cases is simply discharged, resulting in pollution problems in rivers, bays, and estuaries.

Not all municipal wastewater treatment systems suffer from an infrastructure problem. Newer treatment sites may have installed separate systems for wastewater and storm water, such that the two wastewaters do not mix. However, in older treatment sites, both storm water and wastewater are fluidly connected and mixed during a storm event. Certain storms have the capacity to produce a volume of water that exceeds the treatment limit of these conventional municipal wastewater sites.

Storm water may contain a high concentration of pollutants. When left untreated, storm water may have an impact on water quality, biological resources, and public health. The discharge limits for various pollutants are often exceeded by untreated storm water that is discharged. Specifically, storm water runoff, a volume of storm water that flows over paved surfaces and into the nearest waterway, can contain a high concentration of pollutants, including sediment (suspended solids) and fats, oils, and grease (FOG). For instance, storm water runoff from urban areas with many roads, parking lots, and industrial areas may contain an especially high concentration of FOG.

Certain conventional solids-liquid separation units, for example clarifiers, settling basins, and other sedimentation separation units that utilize gravitational forces to separate suspended solids from wastewater, may not be effective at removing FOG from wastewater. Thus, storm water runoff treated with conventional solids-liquid separation units may not meet municipal discharge requirements.

There is a need in the wastewater treatment industry for a solution to the excess wastewater flow problem caused by issues with Combined Sewer Overflow (CSO) during wet weather events. Specifically, there is a need for an effective treatment system to produce treated water meeting all of the municipal discharge requirements. In some embodiments, systems and methods disclosed herein provide a solution to treatment problems with overflow wastewater caused, for example, by wet weather events. The systems and methods disclosed herein may be capable of producing treated water having been biologically treated and treated for removal of FOG. Systems and methods disclosed herein may provide advantages with regard to, for example, capital costs, operational costs, efficiency, and environmental-friendliness, as compared to conventional wastewater treatment systems.

In some embodiments, methods and systems disclosed herein provide a wastewater treatment system including an overflow wastewater treatment sub-system capable of adequately treating overflow wastewater. The overflow wastewater treatment sub-system may receive wastewater responsive to an increased flow rate of wastewater, including storm water runoff, or responsive to an increased concentration of FOG in the wastewater. The overflow wastewater sub-system may comprise a dissolved air flotation (DAF) unit capable of removing FOG from wastewater.

Systems and methods disclosed herein may employ a wastewater treatment system comprising a first sub-system and a second sub-system operating in parallel to treat overflow wastewater. Specifically, the first sub-system may comprise a main treatment system having a biological treatment unit and a solids-liquid separation unit, while the second sub-system may comprise an overflow treatment system having a contact tank and a DAF unit. One possible overflow system comprises a biological contact tank followed by a DAF unit. For instance, the second sub-system may comprise a Captivator® treatment system (Evoqua Water Technologies LLC, Warrendale, Pa.).

Aspects and embodiments disclosed herein are directed toward systems and methods for treating wastewater. As used herein the term "wastewater" includes, for example, municipal wastewater, industrial wastewater, agricultural wastewater, storm water, and any other form of liquid to be treated containing undesired contaminants. Aspects and embodiments disclosed herein may be utilized for primary wastewater treatment, secondary wastewater treatment, or both. Aspects and embodiments disclosed herein may remove sufficient contaminants from wastewater to produce product water that may be used for, for example, irrigation water, potable water, cooling water, boiler tank water, or for other purposes. Specifically, aspects and embodiments disclosed herein are directed toward systems and methods for treating overflow wastewater. Overflow wastewater may include excess storm water from a wet weather event or any other excess wastewater.

As the term is used herein, an "upstream" unit operation refers to a first unit operation which is performed upon a fluid undergoing treatment prior to a second unit operation. Similarly, an "upstream" treatment vessel, conduit, or portion thereof refers to a first treatment vessel, conduit, or portion thereof in which a first unit operation is performed prior to a second unit operation performed in a second treatment vessel, conduit, or portion thereof. A "downstream" unit operation refers to a second unit operation which is performed upon a fluid undergoing treatment subsequent to a first unit operation. Similarly, a "downstream" treatment vessel, conduit, or portion thereof refers to a second treatment vessel, conduit, or portion thereof in which a second unit operation is performed subsequent to a first unit operation performed in a first treatment vessel, conduit, or portion thereof.

An upstream unit operation and/or treatment vessel having an outlet in "direct fluid communication" with an inlet of a downstream unit operation and/or treatment vessel directs material output from the outlet of the upstream unit operation and/or treatment vessel into the inlet of the downstream unit operation and/or treatment vessel without any intervening operations performed on the material.

Various unit operations and/or treatment vessels disclosed herein separate fluid and/or sludge into a solids-rich portion and a solids-lean portion wherein the solid-lean potion has a lower concentration of solids than the solids-rich portion. As the term is used herein, "recycle" of material refers to directing material from an outlet of a downstream unit operation and/or treatment vessel to an inlet of a unit operation and/or treatment vessel upstream of the downstream unit operation and/or treatment vessel.

As disclosed herein, structures may be referred to as tanks, units, vessels, conduits, etc. It should be understood that the configurations described herein may comprise or contain any such structure, including, but not limited to, tanks, units, vessels, conduits, pipes, channels, canals, basins, tubes, and containers. For instance, a contact tank may comprise or contain a tank, conduit, pipe, basin, vessel, etc. As another example, a dissolved air flotation unit may comprise or contain a tank, conduit, pipe, basin, vessel, etc. Furthermore, unless expressly disclosed, any structure disclosed herein may be at least partially open or closed.

In accordance with an aspect, there is provided a wastewater treatment system comprising a first sub-system and a second sub-system. The first sub-system and the second sub-system may be arranged to operate in a parallel configuration. In some embodiments, the first sub-system and the second sub-system do not operate in series. Generally, the first sub-system may operate substantially continuously as a main wastewater treatment system. The second sub-system may operate selectively and/or on demand as an overflow wastewater treatment system. The second sub-system may operate responsive to an increased volume in wastewater to be treated. In some embodiments, the first sub-system may comprise a wastewater conduit, a biological treatment unit, and a solids-liquid separation unit. The second sub-system may comprise a contact tank and a DAF unit. Either system may further comprise one or more fluid conduits, recycle lines, valves, controls, and in-line or external measurement devices to further enhance operation. The nature and function of the first sub-system may be similar to those described in co-pending U.S. patent application Ser. No. 15/056,348, titled "Enhanced Biosorption of Wastewater Organics using Dissolved Air Flotation with Solids Recycle," published as US 2016/0200609 A1, which is herein incorporated by reference in its entirety for all purposes.

In some embodiments, the first sub-system comprises a wastewater conduit in fluid communication with a source of wastewater. The wastewater conduit may have a wastewater outlet and an overflow outlet, the overflow outlet configured to output overflow wastewater. The downstream components of the first sub-system may be in fluid communication with the wastewater outlet. The second sub-system may be in selective fluid communication with the overflow outlet of the wastewater conduit. In some embodiments, the wastewater conduit may comprise one or more valves, sometimes referred to herein as "overflow valve," configured to allow wastewater flow to downstream system components. For instance, the wastewater conduit may comprise an overflow valve configured to selectively provide fluid communication between the overflow outlet and the second sub-system. The valve may be opened or closed responsive to an increased flow rate of the wastewater through the wastewater conduit.

In some embodiments, the system further comprises a flow meter positioned upstream from the overflow valve. The flow meter may be positioned within the wastewater conduit or upstream from the wastewater conduit. For instance, the flow meter may be in-line within the wastewater conduit. The flow meter may generally be positioned upstream from the overflow outlet. The flow meter may be configured to measure a flow rate of the wastewater. The flow meter may be in electrical communication with the overflow valve, which may be configured to provide fluid communication between the overflow outlet and the second sub-system responsive to a flow rate measurement received from the flow meter. Specifically, the overflow valve may be configured to provide fluid communication to the second sub-system responsive to a flow rate of the wastewater exceeding a threshold flow rate.

Generally, each municipal wastewater treatment system may have a different capacity for volume and flow rate of wastewater to be treated. The threshold flow rate for each system may be dependent on the capacity of the main treatment operation, the first sub-system. In some embodiments, the first sub-system may process, on average, about 100 million gallons of wastewater per day. Wastewater treatment systems may generally designed such that they are capable of processing a larger volume and flow rate than the expected demand. In such embodiments, the first sub-system may be capable of processing up to about 30 or up to about 40 million gallons above its average daily processing volume without having hydraulic or system problems.

Systems and methods disclosed herein are contemplated for various sizes and expected volume capacities of wastewater. For instance, the first sub-system may process, on average 10 million gallons of wastewater per day, 50 million gallons of wastewater per day, 100 million gallons of wastewater per day, 200 million gallons of wastewater per day, or any expected volume and flow rate of wastewater. The first sub-system may be capable of processing an additional volume and flow rate of wastewater, greater than its average daily volume. In some embodiments, a first sub-system may process between about 10%, about 20%, about 30%, or about 40% more wastewater per day than its average daily wastewater processing volume before wastewater is directed to the second sub-system. In some embodiments, the overflow second sub-system receives wastewater when they wastewater volume is projected to be greater than the average daily wastewater volume that is treated by the first sub-system. For instance, in some embodiments, the overflow second sub-system receives wastewater when the wastewater volume is projected to be about 10% greater than the average daily wastewater volume, projected to be about 20% greater than the average daily wastewater volume, projected to be about 30% greater than the average daily wastewater volume, or projected to be about 40% greater than the average daily wastewater volume.

Wet weather events may further cause a surge in flow rate of wastewater to be treated. The threshold flow rate may further depend on a peak flow rate of the wastewater as it is delivered to the wastewater treatment system. Certain wastewater treatment systems may be able to process a peak flow rate that is about three or four times greater than the average flow rate of the system. A peak flow rate that is greater than three or four times the average flow rate of the system may cause hydraulic and/or other processing problems on the first sub-system. For example, a system that is designed to handle an average of about 10 million gallons per day may have the capacity to process a peak flow rate of about 40 million gallons per day and bypass anything in excess of this flow rate. In another example, a system that is designed to handle an average of about 100 million gallons per day may be able to process a peak flow rate of about 200 million gallons per day, and bypass anything in excess of this flow rate. In some embodiments, the threshold flow rate is any flow rate greater than the average flow rate of the system, a flow rate that is about twice the average flow rate of the system, a flow rate that is about three times the average flow rate of the system, or a flow rate that is about four times the average flow rate of the system. Thus, in some embodiments, the overflow valve may be configured to provide fluid communication to the second sub-system responsive to a flow rate of the wastewater exceeding the average flow rate of the system, exceeding about twice the average flow rate of the system, exceeding about three times the average flow rate of the system, or exceeding about four times the average flow rate of the system.

In certain embodiments, the system may further comprise a sensor configured to measure a concentration of contaminants in the wastewater. The sensor may be in-line or in fluid communication with the wastewater. The sensor may be positioned within the wastewater conduit or upstream from the wastewater conduit. The sensor may be in fluid communication with the wastewater conduit. The sensor may be in electrical communication with the overflow valve, which may be configured to provide fluid communication between the overflow outlet and the second sub-system responsive to a contaminant concentration measurement received from the sensor. The sensor may be configured to measure a concentration of fats, oils, and grease (FOG) in the wastewater. For instance, the sensor may be or comprise an infrared analyzer. In some embodiments, FOG is measured by gravimetric analysis. Exemplary sensors include the InfraCal® TOG/TPH (Wilks Enterprise, East Norwalk, Conn.), and Fourier Transform Infrared (FTIR) spectrometers, for example, as distributed by Thermo Fisher Scientific (Waltham, Mass.) and EMD Millipore (subsidiary of Merck KGaA, Darmstadt, Germany).

In certain embodiments, the overflow valve may be configured to provide fluid communication to the second sub-system responsive to an increased concentration of FOG in the wastewater exceeding a threshold concentration. In some embodiments, the threshold concentration of FOG is 300 mg/L, 400 mg/L, or 500 mg/L. Thus, the system may be configured to allow fluid communication between the wastewater conduit and the second sub-system when the concentration of FOG in the wastewater is 300 mg/L or more, 400 mg/L or more, or 500 mg/L or more.

The first sub-system may comprise a biological treatment unit. Generally, biological treatment units are known to one skilled in the art. The biological treatment unit may be configured to biologically break down organic components of the wastewater to form a first mixed liquor. The biological treatment unit may comprise an aerobic treatment unit, an anaerobic treatment unit, or a combination of both. The biological treatment units disclosed herein generally employ an activated sludge process (ASP) system. The ASP system may comprise a conventional ASP or a cyclic ASP. The biological treatment unit may further comprise a membrane bioreactor, a fluidized bed bioreactor, or an integrated fixed film activated sludge process.

In some embodiments, the biological treatment unit may be supplied with sufficient oxygen for aerobic conditions to be created in the biological treatment unit. In other embodiments, the amount of oxygen supplied may be insufficient to meet the entire oxygen demand of the first mixed liquor and the biological treatment unit, or at least a portion thereof, may be maintained in an anoxic or anaerobic condition. Nitrification and denitrification of the first mixed liquor may occur in different portions of the aerated biological treatment unit. Residence time for the first mixed liquid in the biological treatment tank may be from about three to about eight hours. This residence time may be increased if the influent wastewater to be treated and/or the first mixed liquor contains a high level of oxidizable biological materials or decreased if the wastewater and/or the first mixed liquor includes a low level of oxidizable biological materials.

The biological treatment unit may have an inlet in fluid communication with the wastewater outlet of the wastewater conduit. Generally, the biological treatment unit is in substantially continuous operation and fluid communication with the wastewater. As previously mentioned, the first sub-system, and thus the biological treatment unit, may continuously process an average of about 100 million gallons of wastewater per day (379,000 m$^3$/day). Accordingly, the biological treatment unit may safely process up to about 120, about 130, or about 140 million gallons of wastewater per day (454,000 m$^3$/day, 492,000 m$^3$/day, or 530,000 m$^3$/day, respectively).

The biological treatment unit of the first sub-system may comprise an aerated anoxic region and an aerobic region included in the same treatment unit and separated therefrom by a partition or weir. Alternately, the biological treatment unit of the first sub-system may comprise an aerated anoxic tank and an aerobic tank fluidly connected to each other. For instance, the aerated anoxic tank may have an inlet in fluid communication with the wastewater conduit. The aerobic tank may have an inlet in fluid communication with the aerated anoxic tank.

The first sub-system may further comprise a solids-liquid separation unit having an inlet in fluid communication with the biological treatment unit. The solids-liquid separation unit may be configured to separate solids from a portion of the first mixed liquor and form a first solids-lean effluent and a return activated sludge (RAS). The solids-liquid separation unit may further be configured to output the first solids-lean effluent through an effluent outlet and output the return activated sludge through a return activated sludge outlet. In some embodiments, the solids-liquid separation unit comprises a clarifier.

In some embodiments, the solids-liquid separation unit is fluidly connected to a RAS recycle conduit. The RAS recycle conduit may extend between the RAS outlet of the solids-liquid separation unit and the biological treatment unit. The RAS recycle conduit may be configured to deliver a fraction of the RAS to the biological treatment unit, for use in biologically treating the wastewater. In some embodiments, the fraction of the RAS recycled to the biological treatment unit is between about 0% and about 95%, between about 25% and about 95%, between about 50% and about 95%, between about 70% and about 90%, or between about 80% and about 90%. For instance, the fraction of RAS recycled to the biological treatment unit may be about 0%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%. Another fraction of the RAS may be discarded as waste biosolids. The RAS may be recycled or delivered to other components of the system, as described below.

The solids-lean effluent may be discharged through the effluent outlet. Generally, the solids-lean effluent of the solids-liquid separation unit meets government regulated discharge requirements. The solids-lean effluent of the solids-liquid separation unit may be discharged or it may be further processed.

In certain embodiments, the second sub-system comprises a contact tank having a first inlet in selective fluid communication with the overflow outlet of the wastewater conduit. For instance, the first inlet may be in fluid communication with the overflow outlet of the wastewater conduit responsive to the overflow valve allowing wastewater flow to the second sub-system. Accordingly, the contact tank may receive overflow wastewater upon the system receiving and/or recognizing an increased volume of wastewater to be treated.

The contact tank may have a second inlet in selective fluid communication with the RAS outlet. The contact tank may be configured to receive a fraction of the RAS from the first sub-system. Specifically, the contact tank may be configured to receive RAS from the solids-liquid separation unit of the first sub-system. In some embodiments, the fraction of the RAS delivered to the contact tank is between about 5% and about 100%, between about 5% and about 75%, between about 5% and about 50%, between about 10% and about 30%, or between about 10% and about 20%. For instance, the fraction of RAS delivered to the contact tank may be about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%. Generally, the fraction of RAS delivered to the contact tank may depend on flow rate of the overflow wastewater or composition of the overflow wastewater. Briefly, biosorption is dependent on the mass of biological solids and influent contaminants Thus, the volume of RAS needed in the contact tank to treat the wastewater may be dependent on flow rate of the overflow wastewater. In some embodiments, the fraction of RAS delivered to the contact tank and the fraction of RAS recycled to the biological treatment unit together make up about 100% of the RAS formed by the solids-liquid separation unit.

Upon receiving overflow wastewater, the contact tank may be configured to mix the overflow wastewater with RAS to form a second mixed liquor. The second mixed-liquor may be biologically treated by mixing with RAS, such that it meets municipal biological treatment discharge standards. Thus, the second sub-system is generally capable of producing treated water that meets municipal biological treatment discharge standards.

In some embodiments, the contact tank contains a holding volume of water and RAS, in preparation for receipt of overflow wastewater to be treated. In such embodiments, the contact tank may be initiated, such that it receives RAS, upon receipt wastewater into the system. In certain embodiments, the contact tank is in fluid communication with the RAS outlet responsive to the overflow valve allowing wastewater flow to the second sub-system. Accordingly, the contact tank may receive RAS upon the system receiving and/or recognizing an increased volume in wastewater to be treated or an increased concentration of one or more contaminants in wastewater to be treated, as previously described in connection with the second sub-system receiving overflow wastewater. The hydraulic retention time (HRT) of the contact tank may be at least two minutes.

The wastewater treatment system may further comprise a RAS valve positioned upstream from the contact tank. The RAS valve may be configured to selectively provide fluid communication between the RAS outlet of the first sub-system and the contact tank. For instance, the RAS valve may provide fluid communication between the RAS outlet and the contact tank responsive to the overflow valve providing fluid communication between the overflow outlet and the contact tank. In some embodiments, the RAS valve is in electrical communication with the flow meter, and configured to provide fluid communication between the RAS outlet and the contact tank responsive to the flow rate of the wastewater exceeding a threshold flow rate. The threshold wastewater flow rate that triggers the RAS valve to allow fluid flow may be the same or slightly lower than the threshold flow rate that triggers the overflow valve to allow fluid flow. Thus, in some embodiments, the RAS valve may be configured to provide fluid communication to the contact tank responsive to a flow rate of the wastewater matching the average flow rate of the system, exceeding the average flow rate of the system, exceeding about twice the average flow rate of the system, or exceeding about three times the average flow rate of the system.

In some embodiments, the RAS valve may be in electrical communication with the in-line sensor, and configured to provide fluid communication between the RAS outlet and the contact tank responsive to a concentration of one or more contaminants in the wastewater exceeding a threshold concentration. For instance, the RAS valve may be triggered to allow fluid flow by the in-line sensor measuring a threshold concentration of FOG in the wastewater. The threshold concentration of contaminants that triggers the RAS valve to allow fluid flow may be the same or slightly lower than the threshold concentration of contaminants that triggers the overflow valve to allow fluid flow.

The second sub-system may further comprise a DAF unit downstream from the contact tank, the DAF unit having an inlet in fluid communication with the contact tank. Generally, DAF units are known to one skilled in the art. Briefly, DAF treatment is a wastewater treatment operation capable of removing suspended matter, including both suspended solids and FOG. DAF units may remove a significant portion of suspended solids from influent wastewater without the need for oxidation of the solids. Beneficially, the size of downstream components may be reduced, resulting in a lower capital cost for the system. For instance, primary clarifiers may be omitted from the wastewater treatment system.

DAF units may achieve separation of contaminants by dissolving air or another gas in wastewater under pressure and releasing the air or gas under atmospheric pressure in a flotation tank or basin. The released air or gas may form bubbles that adhere to the contaminants and float the contaminants to the surface of the water, where they may be removed. In some embodiments, the floated solids are removed by a mechanical skimming device. The floated solids may be partly recycled to other components in the system, as described in more detail below. The material removed from the wastewater in the dissolved air flotation system may be utilized to produce energy, for example, in the form of biogas in a downstream anaerobic digestion system. The biogas may be used to provide salable energy through combustion or through use in, for example, fuel cells.

The DAF unit may include a vessel, tank, or other open or closed containment unit configured to perform a dissolved air flotation operation. Generally, the DAF unit loading may be less than or equal to about 2000 gallons per day per square foot (g/d/sf) of DAF unit (703 L/d/m$^2$) and less than or equal to 30 pounds per day per square foot (lb/d/sf) of DAF unit (1.26 kg/d/m$^2$). The DAF unit may function as both a thickener unit and a clarifier. In some embodiments, the DAF unit includes two DAF units operating in parallel. In other embodiments, the DAF unit may include a single DAF unit or more than two DAF units. Providing multiple DAF units provides for the system to continue operation if one of the DAF units is taken out of service for cleaning or maintenance.

The DAF unit may be configured to separate suspended matter from a portion of the second mixed liquor and form a second solids-lean effluent, floated solids, and waste solids. In some embodiments, the second mixed liquor is dosed with a coagulant and/or flocculant prior to or after introduction into the DAF unit. The second mixed liquor may be dosed with, for example, ferric chloride or aluminum sulfate. The solids-lean effluent of the DAF unit may meet government regulated discharge requirements. In some embodiments, the DAF unit is capable of removing between about 60% and about 100% of suspended solids in the second mixed liquor. For instance, the DAF unit may remove about 60%, about 70%, about 80%, about 90%, or about 100% of suspended solids in the second mixed liquor. The solids-lean effluent of the DAF unit may be discharged or it may be further processed. In some embodiments, the solids-lean effluent of the DAF unit and the solids-lean effluent of the solids-liquid separation unit may be blended to form a blended discharge stream.

In accordance with certain embodiments, the wastewater treatment system may further comprise a first effluent conduit extending between a floated solids outlet of the DAF unit and a second inlet of the biological treatment unit in the first sub-system. The first effluent conduit may be configured to deliver a fraction of floated solids from the DAF unit to the second inlet of the biological treatment unit in the first sub-system. In some embodiments, the fraction of the floated solids delivered to the biological treatment unit is between about 1% and about 100%. The biological treatment unit may be configured to combine floated solids with the first mixed liquor.

The wastewater treatment system may comprise a second effluent conduit extending between a floated solids outlet of the DAF unit and a third inlet of the contact tank. The effluent conduit between the DAF and contact tank may be a recycle line, configured to recycle floated solids from the DAF unit upstream to the contact tank. The fraction of the floated solids recycled to the contact tank may be between about 1% and about 100%. For instance, the fraction of the floated solids recycled to the contact tank may be greater than about 50%, between about 50% and about 95%, or between about 60% and about 80%. The contact tank may be configured to combine floated solids with the second mixed liquor.

Recycling solids removed in the DAF unit to the contact tank is counter to the conventional operation of wastewater treatment systems including DAF units. Typically, DAF units are utilized in wastewater treatment systems to remove solids from the wastewater, thus reducing the need for biological treatment of these removed solids and reducing the energy requirements of the wastewater treatment system by, for example, reducing the amount of air needed to be supplied to an aerated biological treatment vessel to oxidize the removed solids. It is counter to conventional operation of wastewater treatment systems to re-introduce floated solids separated from mixed liquor from a contact tank in a DAF unit back to the contact tank. Typically, after solids are separated from mixed liquor from a contact tank in a DAF unit, reintroducing the separated solids into mixed liquor in the contact tank and forcing the solids to go through the same separation process in the DAF unit again reduces the efficiency of the system. Such a solids recycle from a DAF unit to a contact tank directly upstream of the DAF unit would cause a need for a greater amount of contact tank capacity and a greater amount of DAF unit capacity. Such a solids recycle from a DAF unit to a contact tank directly upstream of the DAF unit would also require more air flow to the DAF unit to remove the recycled solids from the mixed liquor in addition to any solids that would be present in the absence of the solids recycle. It has been discovered, however, that benefits may be achieved by the counterintuitive re-introduction of solids removed in a DAF unit back into the contact tank of a wastewater treatment system from which mixed liquor is supplied to the DAF unit.

For example, by recycling the solids removed by the DAF unit to the contact tank, the amount of total suspended solids (TSS) in the contact tank may be increased and additional soluble oxidizable biological materials may be adsorbed, as described in co-pending U.S. patent application publication number US 2016/0200609, identified above.

In some embodiments, the wastewater treatment system further comprises a primary clarifier. The primary clarifier may function, generally, as a pre-treatment solids-liquid separation. Thus, the primary clarifier may comprise an inlet in fluid communication with the source of the wastewater. The primary clarifier may be configured to produce a solids-lean effluent and a solids-rich effluent. The solids-lean effluent may exit the primary clarifier through a solids-lean outlet, which may be in fluid communication with at least one of the biological treatment unit and the contact tank. In some embodiments, the primary clarifier is in fluid communication with the biological treatment unit of the first sub-system. In such embodiments, the primary clarifier may be positioned upstream of the biological treatment unit. In some embodiments, the primary clarifier is in fluid communication with the contact tank of the second sub-system. In such embodiments, the primary clarifier may be positioned upstream from the contact tank and downstream from the overflow outlet of the wastewater conduit. The solids-rich effluent may exit the primary clarifier through a solids-rich outlet. The solids-rich effluent of the primary clarifier may be delivered to other downstream operation units, for example a thickener unit or an anaerobic digester, or discarded as waste solids.

The wastewater treatment system may further comprise an anaerobic digester. Non-limiting examples of components or portions of anaerobic systems that can be utilized in one or more configurations of the wastewater treatment systems include, but are not limited to, the DYSTOR® digester gas holder system, the CROWN® disintegration system, the PEARTH® digester gas mixing system, the PFT® spiral guided digester gas holder, the PFT® vertical guided digester holder, the DUO-DECK™ floating digester cover, and the PFT® heater and heat exchanger system, from Evoqua Water Technologies.

The anaerobic digester may be utilized to treat mixed liquor, which may include suspended solids, sludge, and/or solids-rich or solids-lean fluid streams, from one or more other treatment units of the wastewater treatment system. At least a portion of an anaerobically treated sludge produced in the anaerobic digester may be recycled back to one or more other treatment units of the wastewater treatment system. The nature and function of the anaerobic digester and associated recycle streams may be similar to those described in U.S. Pat. No. 8,894,856, titled "Hybrid aerobic and anaerobic wastewater and sludge treatment systems and methods," which is herein incorporated by reference in its entirety for all purposes.

The anaerobic digester may have a first inlet in fluid communication with the DAF unit of the second sub-system, a second inlet in fluid communication with the solids-rich outlet of the primary clarifier, and an outlet in fluid communication with at least one of the solids-liquid separation unit and the biological treatment unit of the first sub-system. In some embodiments, the anaerobic digester may have the first inlet in fluid communication with a DAF unit of the first sub-system. Depending on the other operating parameters, the retention time in the anaerobic digester can be between about seven and about 50 days retention time, and in some embodiments, between about 15 and about 30 days retention time.

The wastewater treatment system may further comprise a thickener unit. In some embodiments, the thickener unit comprises a gravity belt thickener. Generally, thickener units are operated to remove water from sludge, and achieve a reduction in moisture content of slurries. The resulting material may still be fluid. Thickener units may be used as an economic measure to reduce the volume of sludge or for greater efficiency in subsequent processes. In some embodiments, a DAF unit may function as a thickener unit. The thickener unit may comprise an inlet in fluid communication with the solids-rich outlet of the primary clarifier and an outlet in fluid communication with the anaerobic digester. The thickener unit may be configured to thicken the solids-rich effluent of the primary clarifier and deliver the thickened solids-rich effluent to downstream processes, such as to the anaerobic digester.

In certain embodiments, the first sub-system may further comprise one or both of a contact tank and a DAF unit. The contact tank and/or the DAF unit may be positioned upstream from the biological treatment unit. In some embodiments, the second sub-system may further comprise one or both of a biological treatment unit and a solids-liquid separation unit. The biological treatment unit and/or solids-liquid separation unit of either sub-system may be positioned downstream from the contact tank and the DAF unit. Any of the treatment units disclosed herein, including additional units in the first or second sub-systems, may be connected via conduits, valves, pipes, or other connectors, as described herein.

In accordance with another aspect, there is provided a method of treating wastewater comprising directing a first stream of wastewater to a biological treatment unit and biologically treating the first stream of wastewater in the biological treatment unit to form a biologically treated mixed liquor. The method may further comprise directing the biologically treated mixed liquor to a solids-liquid separation unit and separating the biologically treated mixed liquor in the solids-liquid separation unit. The biologically treated mixed liquor may be separated in the solids-liquid separation unit to form a first solids-lean effluent and an activated sludge (RAS). The first stream of wastewater may be treated in the biological treatment unit and solids-liquid separation unit, generally as described above with reference to the first sub-system. Accordingly, the solids-lean effluent from the biological treatment unit and solids-liquid separation unit may meet government discharge requirements.

In some embodiments, the method comprises recycling a fraction of the RAS to the biological treatment unit. The fraction of the RAS that is recycled to the biological treatment unit may be between about 80% and about 90% of the RAS formed by the solids-liquid separation unit. The RAS may be recycled to the front of the biological treatment unit. In some embodiments, the RAS may be recycled to the aerobic region of the biological treatment unit, for instance, downstream of the aerated anoxic region.

In some embodiments, the method of treating wastewater may comprise selectively directing an overflow stream of wastewater to a contact tank operating in parallel with the biological treatment unit and the solids-lean separation unit. Thus, the method may include utilizing two systems operating in a parallel configuration. Each system may be capable of producing treated wastewater that meets government discharge requirements. The overflow stream of the wastewater may be directed to the contact tank responsive to a flow rate of the first stream of the wastewater exceeding a threshold flow rate, as described above. The overflow stream of the wastewater may be directed to the contact tank responsive to a concentration of contaminants in the wastewater exceeding a threshold concentration of contaminants, as described above.

The method may further comprise selectively directing a first fraction of the RAS to the contact tank and mixing the overflow stream of the wastewater with the activated sludge in the contact tank to form an overflow mixed liquor. Selectively directing the first fraction of RAS to the contact tank may comprise directing the RAS responsive to a flow rate of the first stream of the wastewater exceeding a threshold flow rate or responsive to a concentration of contaminants in the wastewater exceeding a threshold concentration of contaminants, as described above. The method may comprise directing the RAS to the contact tank responsive to the same or different threshold flow rate and/or concentration of contaminants as the threshold values for directing the overflow wastewater to the contact tank. In some embodiments, the method may comprise directing RAS to the contact tank responsive to a threshold value of flow rate and/or concentration of contaminants lower than the threshold values for directing the overflow wastewater to the contact tank. For instance, the contact tank may be primed with RAS prior to receiving overflow wastewater. Generally, the RAS directed to the contact tank may comprise between about 10% to about 20% of the RAS formed by the solids-liquid separation unit.

The overflow wastewater and RAS in the contact tank may form an overflow mixed liquor. The method may further comprise directing the overflow mixed liquor to a DAF unit and separating the overflow mixed liquor in the DAF unit, as previously discussed above. In some embodiments, the overflow mixed liquor may be separated to form a second solids-lean effluent, floated solids, and waste solids in the DAF unit. For instance, the pressurized air or gas introduced into the overflow mixed liquor may separate floated solids and waste solids from the wastewater in the DAF unit to form the second solids-lean effluent. In some embodiments, separating the overflow mixed liquor further comprises removing FOG from the overflow mixed liquor. In some embodiments, separating the overflow mixed liquor further comprises removing sedimentation and/or suspended solids from the overflow mixed liquor. Accordingly, the second solids-lean effluent may be substantially free of suspended solids and/or FOG. In some embodiments, the overflow mixed liquor may be separated in a DAF unit to form a second solids-lean effluent having at least about 60% to about 100% less suspended solids than the overflow mixed liquor.

The method may further comprise directing the first solids-lean effluent and the second solids-lean effluent to a treated water outlet. Specifically, the method may comprise directing the solids-lean effluent from the biological treatment unit and directing the solids-lean effluent from the DAF unit to a treated water outlet. The first and second solids-lean effluents may be combined to form a treated water. The treated water may meet government discharge standards. For instance, the treated water may be biologically treated and meets municipal biological treatment standards. The treated water may further be substantially free of FOG.

In certain embodiments, the method further comprises directing a first fraction of the floated solids to the biological treatment unit. The method may further comprise recycling a second fraction of the floated solids to the contact tank. Between about 1% and about 100% of the floated solids may be directed to the biological treatment unit and/or recycled to the contact tank. In some embodiments, about 100% of the floated solids may be redirected and/or recycled. In other embodiments, the method may further comprise discarding a fraction of floated solids as waste solids.

In accordance with certain embodiments, the method may comprise directing a wastewater to a primary clarifier and separating the wastewater in the primary clarifier to form a clarified wastewater and a solids-rich effluent. Generally, the method may comprise directing wastewater to a primary clarifier as a pre-treatment of the wastewater. Accordingly, the method may further comprise directing a first fraction of the clarified wastewater to the first stream of the wastewater. However, the method may further comprise selectively directing a second fraction of the clarified wastewater to the overflow stream of the wastewater. The method may comprise directing clarified wastewater to one or both (first stream and/or overflow stream) of the streams of the wastewater. In some embodiments, clarified wastewater is directed to the overflow stream of wastewater responsive to a flow rate of clarified wastewater in the first stream of the wastewater exceeding a threshold flow rate. The threshold flow rate may be the same as previously described herein.

In accordance with another aspect, there is provided a method of facilitating treatment of overflow wastewater in a biological treatment system comprising a biological treatment unit in fluid communication with a solids-liquid separation unit. The biological treatment unit may be configured to produce a first solids-lean effluent and RAS, as previously described. In some embodiments, the biological treatment system is the first sub-system as previously described. The method of facilitating treatment may comprise connecting an overflow treatment system to an overflow wastewater stream and connecting a RAS conduit between the biological treatment system and the overflow treatment system.

Accordingly, the method may comprise treating wastewater with a biological treatment system, as previously described, and connecting an overflow treatment system capable of operating responsive to an increased wastewater flow rate or concentration of contaminants received by the biological treatment system. In some embodiments, the overflow wastewater system is capable of operating responsive to a projected wastewater volume exceeding an average wastewater volume by about 30% or about 40%. The overflow wastewater stream may be connected to the biological wastewater stream to provide adequate treatment of peak wastewater and/or excess wastewater, for example, storm water generated by a wet weather event.

In some embodiments, the method of facilitating treatment of overflow wastewater comprises providing an overflow treatment system to treat overflow wastewater, as previously described herein. The method may comprise connecting the overflow treatment system in a parallel configuration with the biological treatment system. The overflow treatment system may be in selective fluid communication with the overflow wastewater stream, such that the fluid communication is responsive to a flow rate of the first wastewater stream exceeding a threshold flow rate or a concentration of contaminants in the first wastewater stream exceeding a threshold concentration. The overflow treatment system may comprise a contact tank in fluid communication with a DAF unit, as previously described herein. The method may comprise connecting an overflow treatment system configured to remove fats, oils, and grease from the overflow wastewater stream. The method may further comprise connecting an overflow treatment system configured to remove sedimentation and/or suspended solids from the overflow wastewater stream.

The method of facilitating treatment of overflow wastewater may comprise providing a return activated sludge conduit. The method may comprise connecting the RAS conduit between the biological treatment system and the overflow treatment system. The RAS conduit may be configured to direct a fraction of the RAS to the overflow treatment system. For instance, the fraction of the RAS may be directed to a contact tank in the overflow treatment system. The fraction of the RAS may be directed to the overflow treatment system responsive to the overflow treatment system being in fluid communication with the overflow wastewater stream, as previously described. The method may comprise installing one or more valves on the RAS conduit, configured to allow fluid communication of the RAS.

In certain embodiments, the method of facilitating treatment of overflow wastewater further comprises installing a flow meter upstream of the biological treatment unit and electrically connecting a valve (the wastewater valve or overflow valve) to the flow meter. The flow meter may be configured to measure wastewater flow rate. The wastewater valve may be configured to direct a first fraction of the wastewater to the first wastewater stream and a second fraction of the wastewater to the overflow wastewater stream. The first fraction of the wastewater and the second fraction of the wastewater may be directed responsive to the measurement of wastewater flow rate from the flow meter exceeding a threshold flow rate.

The method may further comprise providing instructions to direct substantially all of the wastewater to the first wastewater stream until the flow meter measures a threshold wastewater flow rate. The method may further comprise directing overflow wastewater to the overflow wastewater stream responsive to the flow meter measuring a flow rate exceeding the threshold flow rate. Specifically, the overflow wastewater may comprise a volume of wastewater that exceeds the volume capable of being processed by the biological treatment system.

In some embodiments, the method of facilitating treatment of overflow wastewater further comprises installing a sensor upstream of the biological treatment unit and electrically connecting the wastewater valve or overflow valve to the sensor. The sensor may be configured to measure a concentration of contaminants in the wastewater. The wastewater valve may be configured to direct a first fraction of the wastewater to the first wastewater stream and a second fraction of the wastewater to the overflow wastewater stream, as previously discussed. The first fraction of the wastewater and the second fraction of the wastewater may be directed responsive to the measurement of contaminants from the sensor exceeding a threshold concentration.

The method may further comprise providing instructions to direct substantially all of the wastewater to the first wastewater stream until the contaminant sensor measures a threshold wastewater flow rate. The method may further comprise directing overflow wastewater to the overflow wastewater stream responsive to the sensor measuring a concentration of contaminants exceeding the threshold concentration.

The method may further comprise providing instructions to direct a fraction of the RAS to the overflow treatment system responsive to the flow meter measuring a flow rate exceeding the threshold flow rate or the sensor measuring a concentration of contaminants exceeding the threshold concentration value. For instance, the method may comprise electrically connecting the RAS valve to the flow meter, as previously described with the wastewater valve. In some embodiments, the fraction of the RAS directed to the overflow treatment system is increased proportionally to the flow rate measured by the flow meter.

One exemplary embodiment, indicated generally at 100, is illustrated in FIG. 1. The first sub-system 100A is arranged in parallel with the second sub-system 100B. Wastewater from a source of wastewater 105 is directed into a wastewater conduit 106 through an inlet. Wastewater flow rate is measured by the in-line wastewater flow meter 122 and concentration of contaminants in the wastewater is measured by the in-line sensor 123. In some embodiments, the flow meter 122 and sensor 123 are electrically connected to a control module (not shown), which is electrically connected to valves 108 and 113. Wastewater conduit 106 includes a wastewater outlet, which fluidly connects the wastewater conduit 106 to the first sub-system 100A. Overflow valve 108 selectively allows wastewater flow through an overflow outlet of the wastewater conduit 106 to the overflow conduit 109, which fluidly connects the wastewater conduit 106 to the second sub-system 100B. A second valve 113 (RAS valve) is positioned within the RAS conduit 175 and selectively allows RAS flow through the RAS conduit 175 from an outlet of the solids-liquid separation unit 140 to an inlet of the contact tank 110. In some embodiments, the RAS conduit 175 may be the only interconnection between the first sub-system 100A and the second sub-system 100B, which are arranged in parallel.

Wastewater from the wastewater conduit 106 is directed into the first sub-system 100A. The wastewater enters biological treatment unit 130 through an inlet. In the biological treatment unit 130, wastewater and biological microorganisms are combined to form a first mixed liquor. To this end, oxygen may be supplied to the first mixed liquor in the biological treatment unit 130 by aeration with an oxygen containing gas, for example, air. The biological treatment unit 130 includes an aerobic region 150 and an aerated anoxic region 160. The aerobic region 150 is in fluid communication downstream of the aerated anoxic region 160 and receives biologically treated anoxic mixed liquor from the aerated anoxic region.

Biologically treated mixed liquor from the biological treatment unit 130 is directed into a solids-liquid separation unit 140 through an inlet. Effluent from the solids-liquid separation unit 140 may be directed to a product water outlet through a conduit 145 or be sent on for further treatment. Activated sludge separated from effluent in the solids-liquid separation unit 140 may be recycled back upstream to a wastewater inlet of the system, the source of wastewater, directed to the contact tank 110 through conduit 175, and/or recycled to the biological treatment unit 130 through conduit 165. The activated sludge may be recycled through conduit 165 to the aerated anoxic region 160 or aerobic region 150 of the biological treatment unit 130. Waste solids 155 may exit the solids-liquid separation unit 140 through a waste outlet. The amount of activated sludge which is recycled to the contact tank 110 and/or biological treatment unit 130 may be an amount equal to or greater than an amount required to maintain a desired population of bacteria in the contact tank 110 or biological treatment unit 130 to perform biological treatment of the mixed liquors within a desired timeframe and/or to protect against depletion of the bacterial population in the event of temporary disruptions in the operation of the treatment system.

Overflow wastewater from the overflow outlet of the wastewater conduit 106 is directed into the second sub-system 100B through overflow conduit 109 when overflow valve 108 is open. The overflow wastewater enters a contact tank 110 through an inlet of the contact tank. In the contact tank 110, the wastewater is mixed with activated sludge recycled through a conduit 175 from the solids-liquid separation unit 130 of the first sub-system 100A. In some embodiments, the contact tank 110 is aerated to facilitate mixing of the wastewater and the activated sludge. The aeration gas may be an oxygen containing gas, for example, air. The contact tank 110 may be provided with sufficient oxygen such that aerobic conditions are maintained in at least a portion of the contact tank 110. Suspended and dissolved solids in the wastewater, including oxidizable biological materials (referred to herein as Biological Oxygen Demand, or BOD), are absorbed into the activated sludge in the contact tank, forming a second mixed liquor. A portion of the BOD may also be oxidized in the contact tank 110. The residence time of the wastewater in the contact tank may be sufficient for the majority of the BOD to be absorbed by the activated sludge, but no so long as for a significant amount of oxidation of the BOD to occur. In some embodiments, for example, less than about 10% of the BOD entering the contact tank 110 is oxidized in the contact tank.

The first mixed liquor formed in the contact tank 110 is directed to the DAF unit 120 through an inlet of the DAF unit 120. The DAF unit 120 may include a vessel, tank, or other open or closed containment unit configured to perform a dissolved air flotation operation as described below. Pressurized air, pressurized gas, or a fluid containing pressurized air or gas is introduced into the DAF unit 120 to adhere to suspended matter, FOG, and BOD in the second mixed liquor and float to the surface. In some embodiments, floated solids removed in the DAF unit 120 are sent out of the system as waste solids through a conduit 125. These waste solids may be disposed of, or in some embodiments, may be treated in a downstream process, for example, an anaerobic digestion process (not pictured) or anaerobic membrane bioreactor (not pictured). In other embodiments, at least a portion of floated solids removed in the DAF unit 120 through an outlet are recycled to the contact tank 110 through recycle conduit 126. Effluent from the DAF unit 120 may be directed to a product water outlet through a conduit 146 or be sent on for further treatment. A portion of the effluent may be recycled (recycle conduit not shown) to supply gas bubbles to the DAF unit 120. For instance, a gas may be dissolved into the recycled portion of effluent, which is then directed back into the DAF unit 120 and mixed with influent second mixed liquor.

Recycling floated solids removed in the DAF unit 120 to the contact tank 110 provides for the contact tank 110 to function as a high rate activated sludge system while the DAF unit 120 functions as a solids-liquid separator. Recycling floated solids removed in the DAF unit 120 to the contact tank 110 provides for greater oxidation of BOD in the contact tank 110 than in systems where floated solids removed from the DAF unit 120 are not recycled to the contact tank because the solids recycled to the contact tank includes living bacteria capable of oxidizing BOD. For example, in systems and methods where floated solids removed in the DAF unit 120 are recycled to the contact tank 110, greater than about 10% of the BOD in wastewater influent to the contact tank 110 may be oxidized in the contact tank 110.

Figure 2:
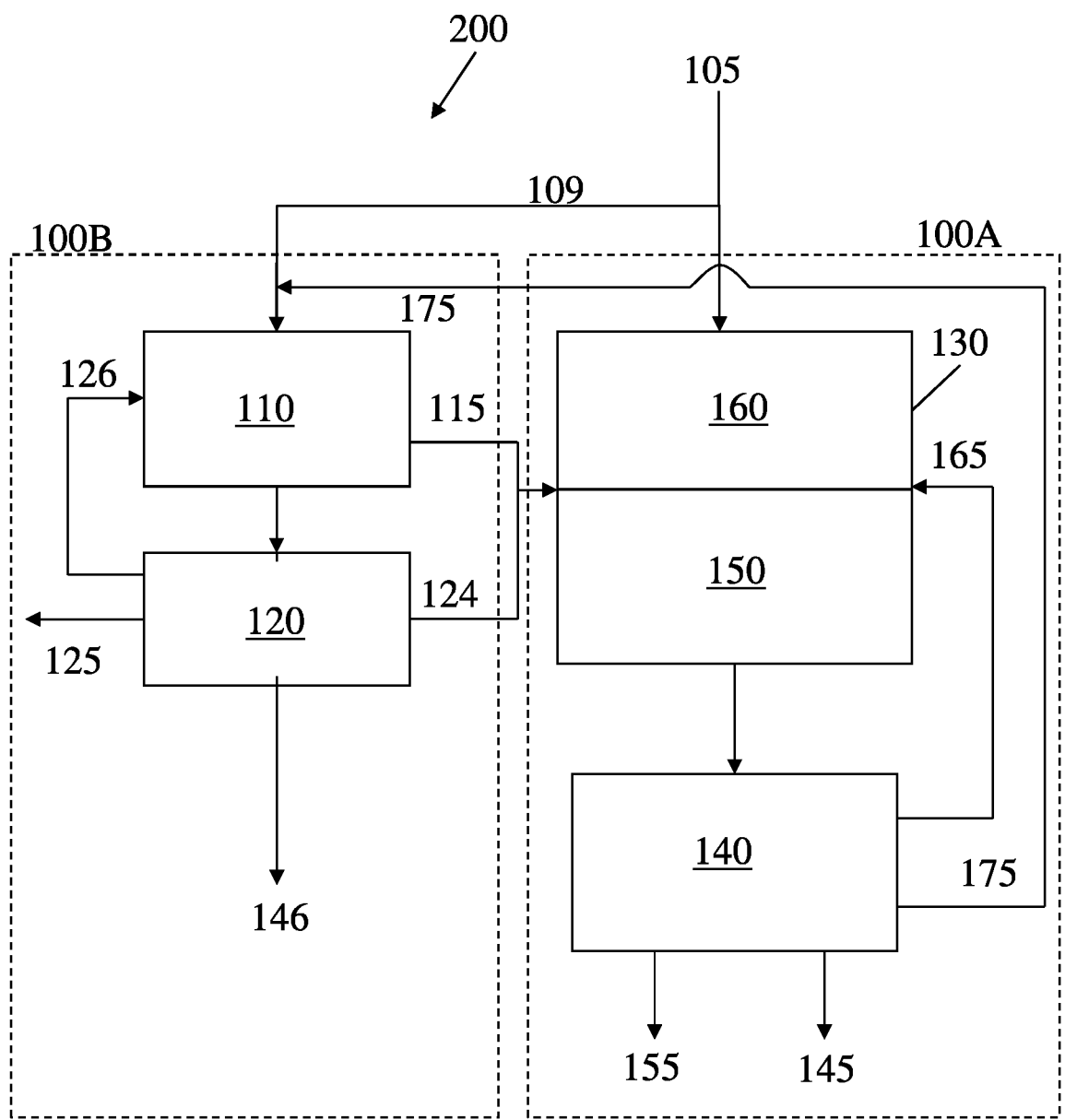
FIG. 2 is an alternate block flow diagram of a wastewater treatment system in accordance with another embodiment.

A second exemplary embodiment, indicated generally at 200, is illustrated in FIG. 2. The wastewater treatment system of the second exemplary embodiment is similar to that of FIG. 1, but further includes a second mixed liquor conduit 115 extending between the contact tank 110 and the biological treatment unit 130 and/or a floated solids conduit 124 extending between the DAF unit 120 and the biological treatment unit 130. The second mixed liquor conduit 115 may be configured to deliver second mixed liquor from the contact tank 110 to the biological treatment unit 130. The floated solids conduit 124 may be configured to deliver floated solids from an outlet of the DAF unit 120 to an inlet of the biological treatment unit 130. Additional conduits, valves, sensors, and controls (not shown) may be included in the system of the second exemplary embodiment.

The second exemplary embodiment may provide cost benefits and a reduction in footprint by reducing the requirement of oxygen in the biological treatment unit 130. The size of the biological treatment unit 130 may be reduced, in some embodiments by up to about 30%.

Figure 3:
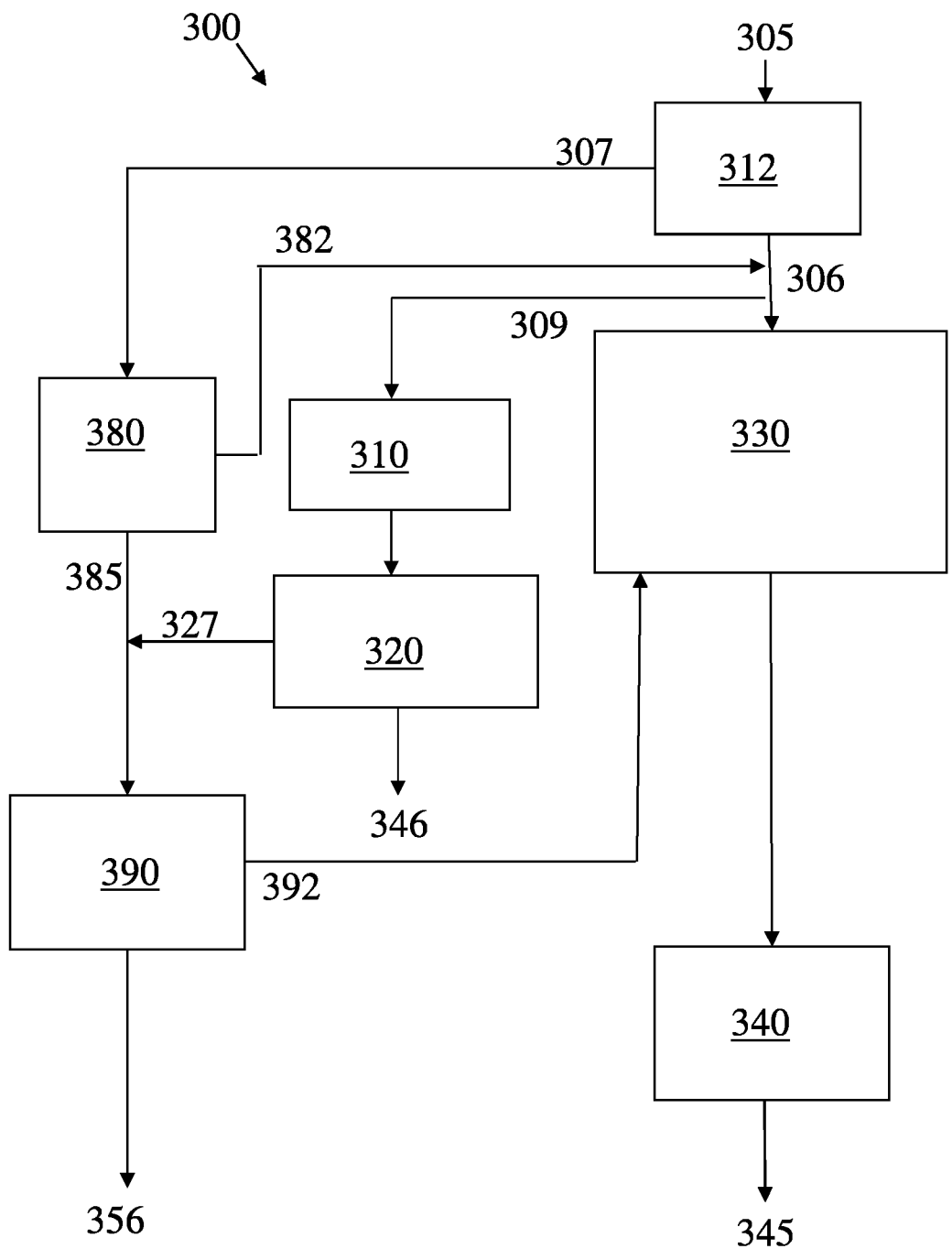
FIG. 3 is yet another alternate block flow diagram of a wastewater treatment system in accordance with another embodiment.

A third exemplary embodiment, indicated generally at 300, is illustrated in FIG. 3. A wastewater treatment system includes an anaerobic treatment unit 390, referred to herein as an anaerobic digester, a primary clarifier 312, a thickener unit 380, a biological treatment unit 330, a solids-liquid separation unit 340, a contact tank 310, and a DAF unit 320. Wastewater from a source of wastewater 305 is directed into a primary clarifier 312 through an inlet of the primary clarifier. A solids-rich fluid stream from the clarifier is directed into an inlet of a thickener unit 380 through conduit 307. A solids-lean effluent from the primary clarifier 312 is directed into an inlet of the wastewater conduit 306. A solids-rich output stream from the thickener unit 380 is directed to an inlet of the anaerobic digester 390 through conduit 385. A solids-lean effluent from the thickener unit 380 is directed to an inlet of the wastewater conduit 306. Overflow wastewater is selectively directed to an inlet of the contact tank 310 through overflow conduit 309, as previously described in other exemplary embodiments. The anaerobic digester 390 is also supplied with floated solids removed from mixed liquor in the DAF unit 320 through conduit 327. In some embodiments, the solids-lean effluent from the primary clarifier 312 and/or thickener unit 380 may be directed instead to a contact tank or biological treatment unit (embodiments not pictured) or to the wastewater conduit 306 through conduit 382.

In some embodiments, the wastewater conduit 306 is positioned upstream from the primary clarifier 312, such that wastewater from the wastewater conduit 306 may be directed to an inlet of a primary clarifier 312 and/or overflow wastewater from the wastewater conduit 306 may be directed to an inlet of the contact tank 110, for example through an overflow conduit. Effluent from the DAF unit 320 is discharged through effluent conduit 346 and effluent from the solids-liquid separation unit 240 is discharged through effluent conduit 345. Generally, effluents 345 and 346 may meet government regulatory requirements, however they may be further processed downstream.

The solids-rich output stream from the thickener unit 380 and any floated solids from the DAF unit 320 introduced into the anaerobic digester 390 through an inlet are combined and anaerobically digested in the anaerobic digester. Effluent from the anaerobic digester 390 may be directed to an inlet of the biological treatment unit 330 through conduit 392. Effluent from the anaerobic digester may be discharged through effluent outlet 356. The anaerobic digestion process can be operated at temperatures between about 20° C. and about 75° C., depending on the types of bacteria utilized during digestion. For example, use of mesophilic bacteria typically requires operating temperatures of between about 20° C. and about 45° C., while thermophilic bacteria typically require operating temperatures of between about 50° C. and about 75° C. In certain embodiments, the operating temperature may be between about 25° C. and about 35° C. to promote mesophilic activity rather than thermophilic activity.

Additional conduits, valves, sensors, and controls (not shown) may be included in the system of the third exemplary embodiment. For instance, the third exemplary embodiment may further include recycle conduits, waste conduits, a control module, control valves, etc.

Further embodiments may include any combination of features of the systems described above.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method, and components thereof, according to the present disclosure may further comprise a network or systems or be a component of a system for treating wastewater. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve a wastewater treatment system. Accordingly the foregoing description and figures are by way of example only. Further the depictions in the figures do not limit the disclosures to the particularly illustrated representations.

While exemplary embodiments are disclosed herein, many modifications, additions, and deletions may be made therein without departing from the spirit and scope of the inventive aspects and their equivalents, as set forth in the following claims.

What is claimed is:

1. A wastewater treatment system comprising a first sub-system and a second sub-system operating in a parallel configuration,
the first sub-system comprising:
a wastewater conduit in fluid communication with a source of wastewater, the wastewater conduit having a wastewater outlet and an overflow outlet, the overflow outlet configured to output overflow wastewater;
a biological treatment unit having an inlet in fluid communication with the wastewater outlet, the biological treatment unit configured to biologically break down organic components of the wastewater to form a first mixed liquor; and
a solids-liquid separation unit having an inlet in fluid communication with the biological treatment unit, the solids-liquid separation unit configured to separate solids from a portion of the first mixed liquor and form a first solids-lean effluent and a return activated sludge, and configured to output the first solids-lean effluent through an effluent outlet and output the return activated sludge through a return activated sludge outlet, and
the second sub-system comprising:
a contact tank having a first inlet in selective fluid communication with the overflow outlet, a second inlet in selective fluid communication with the return activated sludge outlet, the contact tank configured to mix the overflow wastewater with the return activated sludge to form a second mixed liquor; and
a dissolved air flotation unit having an inlet in fluid communication with the contact tank, the dissolved air flotation unit configured to separate suspended matter from a portion of the second mixed liquor and form a second solids-lean effluent, floated solids, and waste solids, and configured to output the second solids-lean effluent through an effluent outlet of the dissolved air flotation unit;
a flow meter coupled to the wastewater conduit and configured to measure a flow rate of the wastewater;
an overflow valve positioned upstream from the contact tank in electrical communication with the flow meter, the overflow valve configured to selectively provide fluid communication between the overflow outlet and the contact tank responsive to the flow rate of the wastewater exceeding a first threshold flow rate; and
a return activated sludge valve positioned upstream from the contact tank, the return activated sludge valve configured to selectively provide fluid communication between the return activated sludge outlet and the contact tank responsive to the flow rate of the wastewater exceeding a second threshold flow rate, the second threshold flow rate being lower than the first threshold flow rate.

2. The system of claim 1, wherein the solids-liquid separation unit comprises a clarifier.

3. The system of claim 1, further comprising an effluent conduit providing direct fluid communication between a floated solids outlet of the dissolved air flotation unit and a second inlet of the biological treatment unit.

4. The system of claim 1, further comprising an effluent conduit extending between a floated solids outlet of the dissolved air flotation unit and a third inlet of the contact tank.

5. The system of claim 1, wherein the biological treatment unit comprises an aerated anoxic region and an aerobic region.

6. The system of claim 1, further comprising a primary clarifier having an inlet in fluid communication with the source of the wastewater, a solids-lean outlet, and a solids-rich outlet, the solids-lean outlet in fluid communication with at least one of the biological treatment unit and the contact tank.

7. The system of claim 6, further comprising an anaerobic digester having a first inlet in fluid communication with the dissolved air flotation unit and an outlet in fluid communication with at least one of the solids-liquid separation unit and the biological treatment unit.

8. The system of claim 7, further comprising a thickener unit having an inlet in fluid communication with the solids-rich outlet of the primary clarifier and an outlet in fluid communication with a second inlet of the anaerobic digester.

9. The system of claim 1, wherein the dissolved air flotation unit is configured to remove fats, oils, and grease from the second mixed liquor.

10. The system of claim 1, further comprising a contaminant concentration sensor in fluid communication with the wastewater and configured to measure a concentration of fats, oil, and grease (FOG) in the wastewater, the overflow valve being further configured to selectively provide fluid communication between the overflow outlet and the contact tank responsive to the concentration of FOG in the wastewater exceeding a first threshold concentration.

11. The system of claim 10, wherein the return activated sludge valve is configured to selectively provide fluid communication between the return activated sludge outlet and the contact tank responsive to the concentration of FOG in the wastewater exceeding a second threshold concentration, the second threshold concentration being lower than the first threshold concentration.

12. A method of treating wastewater, the method comprising:
receiving wastewater through an inlet of a system for treating wastewater;
measuring a flow rate of the wastewater flowing through the inlet of the system;
directing a first stream of wastewater to a biological treatment unit and biologically treating the first stream of the wastewater in the biological treatment unit to form a biologically treated mixed liquor;
directing the biologically treated mixed liquor to a solids-liquid separation unit and separating the biologically treated mixed liquor in the solids-liquid separation unit to form a first solids-lean effluent and an activated sludge;
selectively directing an overflow stream of wastewater to a contact tank, the contact tank operating in parallel with the biological treatment unit and the solids-liquid separation unit, the overflow stream of the wastewater being directed to the contact tank responsive to a flow rate of the wastewater exceeding a first threshold flow rate;
selectively directing a first fraction of the activated sludge to the contact tank responsive to the flow rate of the wastewater exceeding a second threshold flow rate, the second threshold flow rate being lower than the first threshold flow rate;

mixing the overflow stream of the wastewater with the first fraction of the activated sludge in the contact tank to form an overflow mixed liquor;

directing the overflow mixed liquor to a dissolved air flotation unit and separating the overflow mixed liquor in the dissolved air flotation unit to form a second solids-lean effluent, floated solids, and waste solids; and directing the first solids-lean effluent and the second solids-lean effluent to a treated water outlet.

13. The method of claim 12, further comprising directing a first fraction of the floated solids to the biological treatment unit through a conduit providing direct fluid communication between a floated solids outlet of the dissolved air flotation unit and an inlet of the biological treatment unit.

14. The method of claim 12, wherein the first fraction of the activated sludge comprises between about 5% and about 100% of the activated sludge.

15. The method of claim 12, further comprising recycling a second fraction of the activated sludge to the biological treatment unit.

16. The method of claim 13, further comprising directing a second fraction of the floated solids to the contact tank.

17. The method of claim 12, further comprising:
directing the wastewater to a primary clarifier and separating the wastewater in the primary clarifier to form a clarified wastewater and a solids-rich effluent; and
directing a first fraction of the clarified wastewater to the first stream of the wastewater, and selectively directing a second fraction of the clarified wastewater to the overflow stream of the wastewater responsive to the flow rate of the wastewater exceeding the first threshold flow rate.

18. The method of claim 12, wherein separating the overflow mixed liquor in the dissolved air flotation unit further comprises removing fats, oil, and grease from the overflow mixed liquor.

19. The method of claim 12, further comprising:
measuring a concentration of fats, oil, and grease (FOG) in the wastewater; and
selectively directing the overflow stream of wastewater to the contact tank responsive to the concentration of FOG in the wastewater exceeding a first threshold concentration.

20. The method of claim 19, further comprising selectively directing the first fraction of the activated sludge to the contact tank responsive to the concentration of FOG in the wastewater exceeding a second threshold concentration, the second threshold concentration being lower than the first threshold concentration.

* * * * *